(12) United States Patent
Imanishi (10) Patent No.: US 10,302,149 B2
(45) Date of Patent: May 28, 2019

(54) CLUTCH DEVICE

(71) Applicant: EXEDY Corporation, Neyagawa-shi, Osaka (JP)

(72) Inventor: Yoshio Imanishi, Neyagawa (JP)

(73) Assignee: EXEDY CORPORATION, Neyagawa-Shi, Osaka (JP)

( * ) Notice: Subject to any disclaimer, the term of this patent is extended or adjusted under 35 U.S.C. 154(b) by 15 days.

(21) Appl. No.: 15/549,247

(22) PCT Filed: Jan. 13, 2016

(86) PCT No.: PCT/JP2016/050768
§ 371 (c)(1),
(2) Date: Aug. 7, 2017

(87) PCT Pub. No.: WO2016/143370
PCT Pub. Date: Sep. 15, 2016

(65) Prior Publication Data
US 2018/0031053 A1    Feb. 1, 2018

(30) Foreign Application Priority Data

Mar. 9, 2015    (JP) .................................. 2015-045635

(51) Int. Cl.
*F16D 13/52*    (2006.01)
*F16D 13/56*    (2006.01)
(Continued)

(52) U.S. Cl.
CPC ............. *F16D 23/12* (2013.01); *F16D 13/52* (2013.01); *F16D 13/56* (2013.01); *F16D 13/70* (2013.01);
(Continued)

(58) Field of Classification Search
CPC .......... F16D 13/52; F16D 13/54; F16D 13/56; F16D 2013/565; F16D 2300/22
See application file for complete search history.

(56) References Cited

U.S. PATENT DOCUMENTS 5,551,927 A * 9/1996 Enzmann ................ B25B 21/00
464/39
5,617,938 A    4/1997 Tsukada et al.
(Continued)

FOREIGN PATENT DOCUMENTS

CN          1129295 A     8/1996
CN       201281091 Y     7/2009
(Continued)

OTHER PUBLICATIONS

U.S. Appl. No. 15/549,247, filed Aug. 7, 2017, EXEDY Corporation.

(Continued)

*Primary Examiner* — Jacob S. Scott
*Assistant Examiner* — James J Taylor, II
(74) *Attorney, Agent, or Firm* — United IP Counselors, LLC (57) ABSTRACT

A clutch center includes a pressure receiving part. A pressure plate includes a pressure applying part. A clutch part is disposed between the pressure receiving part and the pressure applying part. A cam mechanism includes a first cam part and a second cam part. The first cam part and the second cam part are offset from the clutch center and the pressure plate in an axial direction. The first cam part includes a first slope. The second cam part includes a second slope opposed to the first slope. When the first cam part is rotated relatively to the second cam part in a first direction making up a circumferential direction, the first and second slopes are pressed against each other and separate from each other. The (Continued)

pressure applying part moves toward the pressure receiving part as the first cam part and the second cam part separate.

7 Claims, 9 Drawing Sheets

(51) Int. Cl.
*F16D 13/70* (2006.01)
*F16D 23/12* (2006.01)

(52) U.S. Cl.
CPC .. *F16D 2013/565* (2013.01); *F16D 2023/123* (2013.01)

(56) References Cited

U.S. PATENT DOCUMENTS

| | | | | |
|---|---|---|---|---|
| 8,025,138 | B2 * | 9/2011 | Yoshinaga | F16D 13/52 |
| | | | | 192/54.5 |
| 10,012,272 | B2 * | 7/2018 | Imanishi | F16D 13/52 |
| 10,156,269 | B2 * | 12/2018 | Imanishi | F16D 13/56 |
| 2007/0221465 | A1 | 9/2007 | Okada et al. | |
| 2009/0071792 | A1 | 3/2009 | Kataoka et al. | |
| 2010/0078285 | A1 | 4/2010 | Yoshitsugu et al. | |
| 2011/0024256 | A1 | 2/2011 | Gokan et al. | |
| 2014/0235407 | A1 | 8/2014 | Masayuki | |
| 2014/0353108 | A1 * | 12/2014 | Tokumoto | F16D 13/56 |
| | | | | 192/66.31 |
| 2017/0159725 | A1 * | 6/2017 | Imanishi | F16D 13/52 |
| 2018/0031053 | A1 | 2/2018 | Imanishi | |

FOREIGN PATENT DOCUMENTS

| | | |
|---|---|---|
| CN | 201517568 U | 6/2010 |
| CN | 103890427 A | 6/2014 |
| CN | 104169601 A | 11/2014 |
| DE | 102010032514 A1 | 2/2011 |
| EP | 2169247 A2 | 3/2010 |
| EP | 2778457 A1 | 9/2014 |
| JP | S5491654 A | 7/1979 |
| JP | H11270652 A | 10/1999 |
| JP | 2001107989 A | 4/2001 |
| JP | 2007187244 A | 7/2007 |
| JP | 2010084857 A | 4/2010 |
| JP | 2011033106 A | 2/2011 |
| JP | 4907642 B2 | 4/2012 |
| JP | 2013096421 A | 5/2013 |
| JP | 2013185675 B1 | 8/2013 |
| WO | 2013062063 A1 | 5/2013 |
| WO | 2013133364 A1 | 9/2013 |
| WO | 2014157631 A1 | 10/2014 |

OTHER PUBLICATIONS

U.S. Appl. No. 15/549,308, filed Aug. 7, 2017, EXEDY Corporation.
International Search Report dated Feb. 9, 2016 for corresponding foreign Application No. PCT/JP2016/050768, 2 pp.
International Search Report dated May 24, 2016 for Application No. PCT/JP2016/055775, 2 pp.
First Office Action of the Chinese patent application No. 201680014292.1, dated Sep. 30, 2018, 6 pp.
First Office Action of the Chinese corresponding patent application No. 201680012706.7, dated Nov. 5, 2018, 6 pp.
Non-Final Office Action of the related U.S. Appl. No. 15/549,308, dated Nov. 16, 2018, 16 pp.

* cited by examiner

CLUTCH DEVICE

CROSS-REFERENCE TO RELATED APPLICATIONS

This application is the U.S. National Phase of PCT International Application No. PCT/JP2016/050768, filed on Jan. 13, 2016. That application claims priority to Japanese Patent Application No. 2015-045635, filed Mar. 9, 2015. The contents of both applications are herein incorporated by reference in their entirety.

BACKGROUND

Technical Field

The present disclosure relates to a clutch device.

Background Information

In general, motorcycles (a two-wheeled motorcycle, a buggy, etc.) use a clutch device so as to allow or block transmission of power from an engine to a transmission. The clutch device includes a clutch housing, a clutch center, a clutch part and a pressure plate. The clutch housing is coupled to an engine crankshaft side. The clutch center is coupled to a transmission side. The clutch part is disposed between the clutch housing and the clutch center so as to allow or block transmission of power. The pressure plate is provided for pressing the clutch part.

A clutch device described in Japan Patent No. 4907642 includes a cam mechanism disposed between the clutch center and the pressure plate. When a forward drive force acts on the cam mechanism from a driven gear, the cam mechanism increases the magnitude of clutch engaging force. On the other hand, when a reverse drive force acts on the cam mechanism from a main shaft, the cam mechanism reduces the magnitude of clutch engaging force.

BRIEF SUMMARY

In general, the clutch part is composed of a plurality of clutch plates. When the number of clutch plates is reduced from the perspectives of production cost and so forth, the interval between the clutch center and the pressure plate is preferably narrowed with reduction in number of the clutch plates. However, when the cam mechanism is disposed between the clutch center and the pressure plate as with the aforementioned clutch device, the interval between the clutch center and the pressure plate cannot be narrowed.

It is an object of the present disclosure to provide a clutch device in which the interval between a clutch center and a pressure plate can be narrowed.

A clutch device according to an aspect of the present disclosure includes a clutch housing, a clutch center, a pressure plate, a clutch part and a cam mechanism. The clutch center includes a pressure receiving part. The clutch center is disposed on a first side of the clutch housing in an axial direction. The pressure plate includes a pressure applying part. The pressure applying part is disposed at an interval from the pressure receiving part in the axial direction. The clutch part is disposed between the pressure receiving part and the pressure applying part, and allows and blocks transmission of a power between the clutch housing and the pressure plate. The cam mechanism includes a first cam part and a second cam part. The first and second cam parts are disposed on the first side of the clutch center and the pressure plate in the axial direction. The first cam part includes a first slope. The second cam part includes a second slope opposed to the first slope. When the first cam part is rotated relatively to the second cam part in a first direction making up a circumferential direction, the first slope and the second slope are pressed against each other in the axial direction whereby the first cam part is moved relatively to the second cam part so as to separate from the second cam part in the axial direction. The pressure applying part is moved toward the pressure receiving part as the first cam part is moved relatively to the second cam part so as to separate from the second cam part.

According to this configuration, the cam mechanism is disposed on the first side of the clutch center and the pressure plate in the axial direction. In other words, the cam mechanism is not disposed between the clutch center and the pressure plate. Therefore, the interval between the clutch center and the pressure plate can be narrowed. Additionally, when the first cam part is rotated relatively to the second cam part in the first direction making up the circumferential direction, the pressure applying part is moved toward the pressure receiving part. Hence, an engaging force in the clutch part is increased. It should be noted that in the present disclosure, the expression "the first cam part is moved relatively to the second cam part so as to separate from the second cam part" is conceptualized as an expression encompassing that both the first cam part and the second cam part are moved so as to separate from each other and that only one of the first and second cam parts is moved so as to separate from the other.

Preferably, the first cam part includes a third slope. The second cam part includes a fourth slope opposed to the third slope. When the first cam part is rotated relatively to the second cam part in a second direction, the third slope and the fourth slope are pressed against each other in the axial direction whereby the first cam part is moved relatively to the second cam part so as to separate from the second cam part in the axial direction.

According to this configuration, the engaging force in the clutch part can be increased regardless of in which of the first and second directions the first cam part is moved relatively to the second cam part. Therefore, when the clutch part is composed of a plurality of clutch plates, the number of the clutch plates can be reduced.

Preferably, the clutch device further includes a release member and an urging member. The release member is disposed on the first side of the clutch center in the axial direction and is coupled to the pressure plate. The urging member is disposed between the release member and the clutch center. The pressure applying part faces the first side in the axial direction, and the pressure receiving part faces a second side in the axial direction. The first cam part is fixed to the release member, and the second cam part is fixed to the clutch center.

Preferably, the clutch device further includes a support member and an urging member. The support member is coupled to the clutch center and is disposed on the first side of the pressure plate in the axial direction. The urging member is disposed between the support member and the pressure plate. The pressure applying part faces a second side in the axial direction, and the pressure receiving part faces the first side in the axial direction. The first cam part is fixed to the support member, and the second cam part is fixed to the pressure plate.

Preferably, the third slope faces a second side in the axial direction and the second direction making up the circumferential direction. The fourth slope faces the first side in the axial direction and faces the first direction making up the circumferential direction.

Preferably, the first slope faces the second side in the axial direction and the first direction making up the circumferential direction. The second slope faces the first side in the axial direction and the second direction making up the circumferential direction.

When the clutch device is rotated in the first direction making up the circumferential direction, the third slope may slant at a greater angle than the first slope. According to this configuration, the engaging force in the clutch part can be reduced when the clutch device is rotated in the second direction than when the clutch device is rotated in the first direction.

According to the present disclosure, the interval between the clutch center and the pressure plate can be narrowed.

DETAILED DESCRIPTION OF EMBODIMENTS

Figure 1:
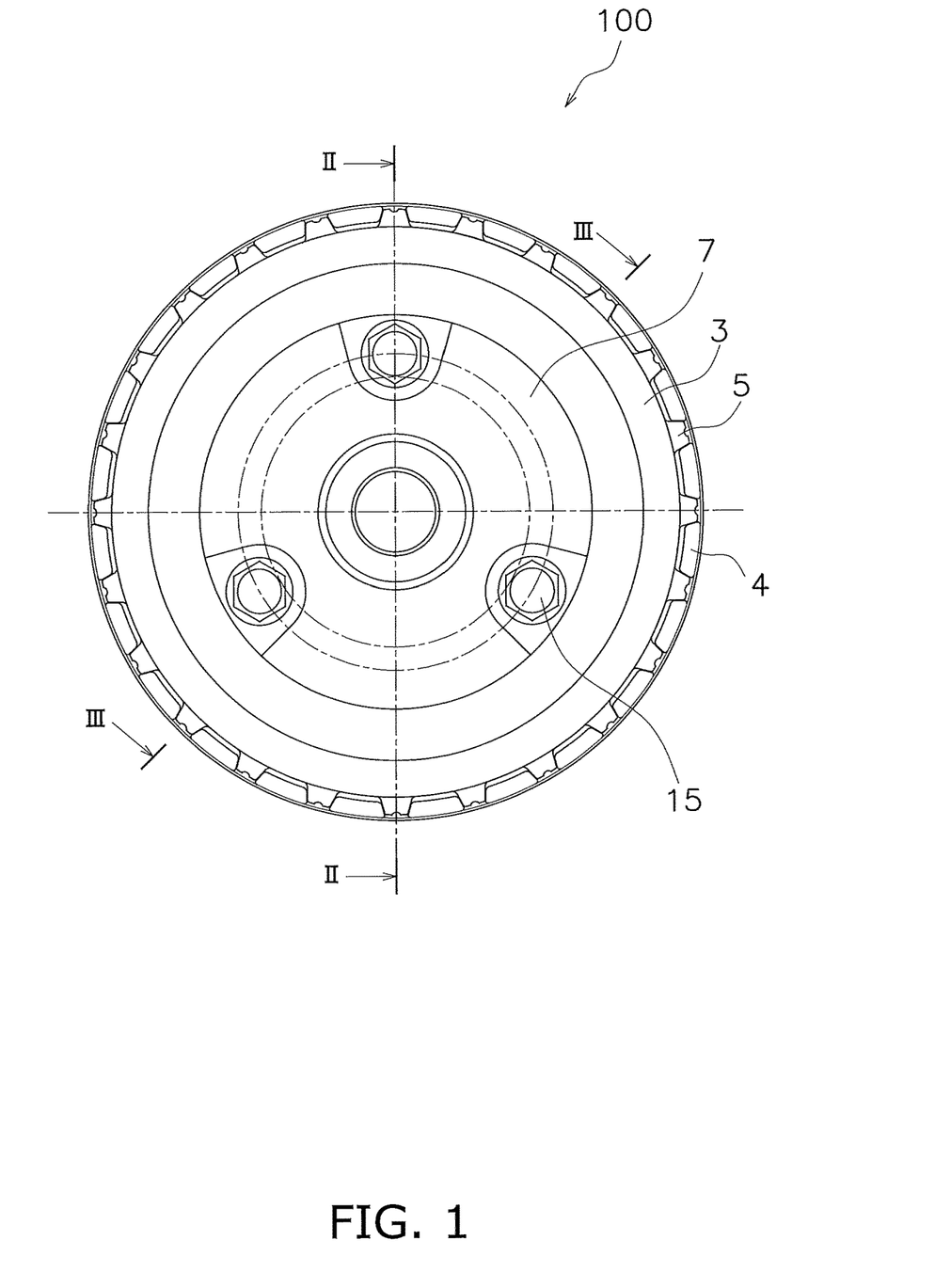
FIG. 1 is a plan view of a clutch device.
Figure 2:
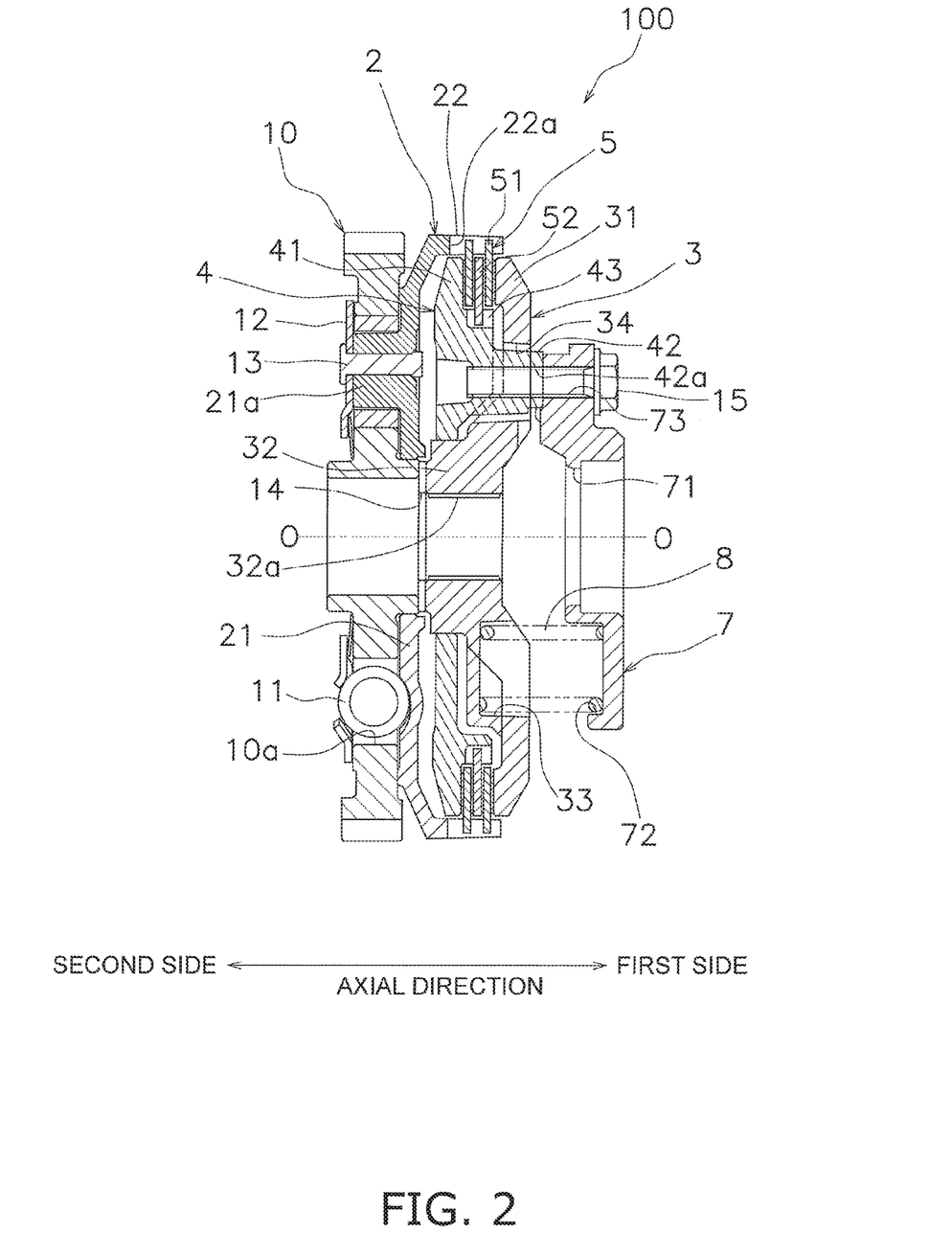
FIG. 2 is a cross-sectional view of FIG. 1 taken along line II-II.
Figure 3:
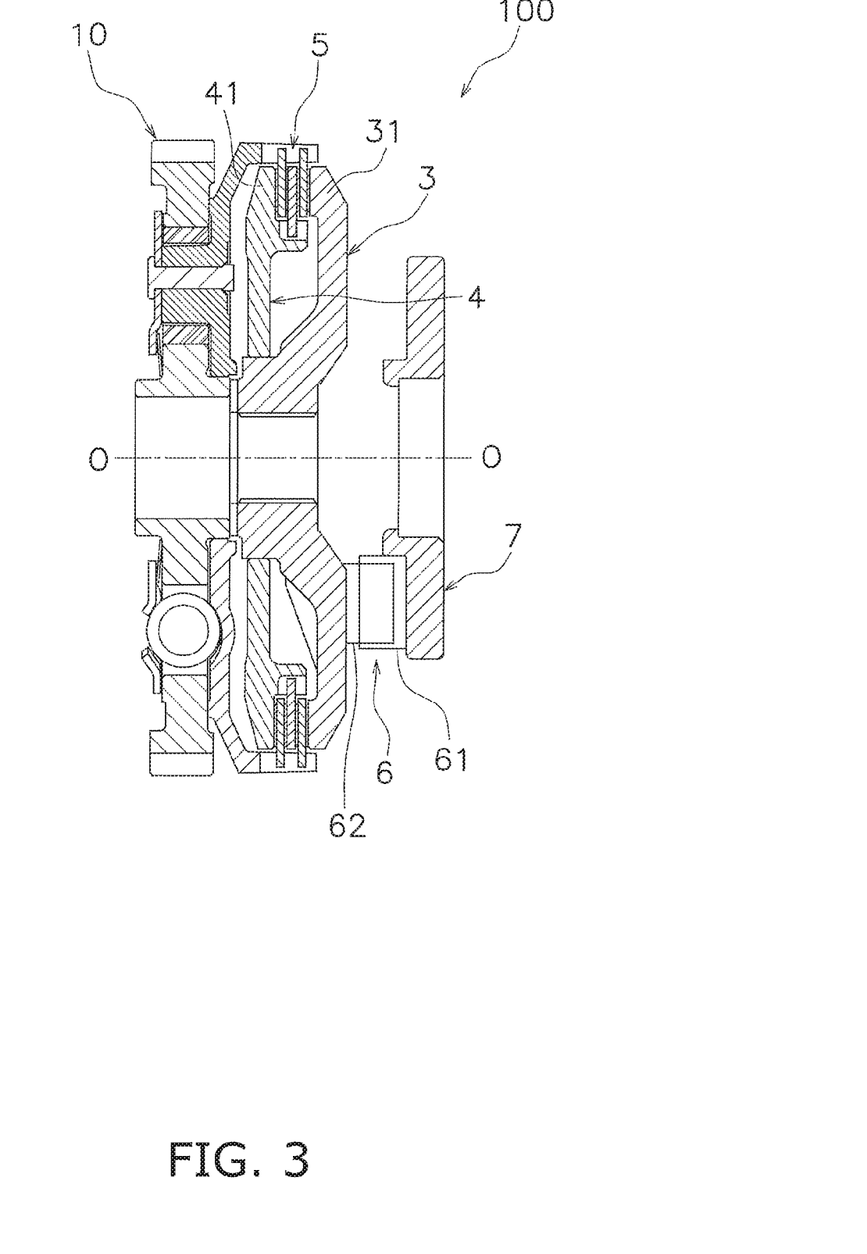
FIG. 3 is a cross-sectional view of FIG. 1 taken along line III-III.
Figure 4:
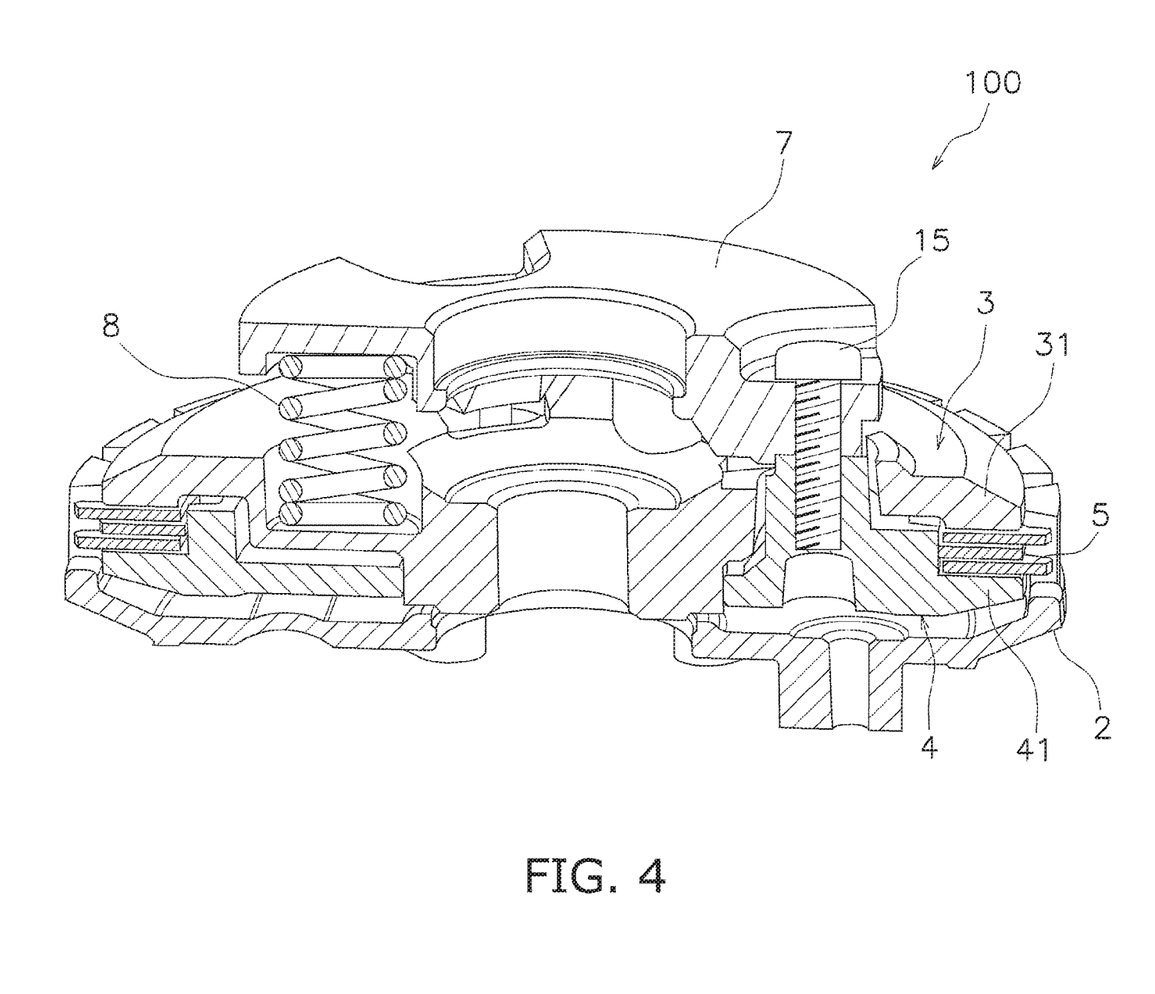
FIG. 4 is a cross-sectional perspective view of the clutch device.

An exemplary embodiment of a clutch device according to the present disclosure will be explained with reference to drawings. It should be noted that the clutch device according to the present exemplary embodiment is used in a motorcycle. FIG. 1 is a plan view of the clutch device; FIG. 2 is a cross-sectional view of FIG. 1 taken along line II-II; FIG. 3 is a cross-sectional view of FIG. 1 taken along line III-III; and FIG. 4 is a cross-sectional perspective view. It should be noted that the term "axial direction" refers to an extending direction of a rotational axis O of the clutch device, and the term "first side in the axial direction" refers to one side in the axial direction. It should be noted that in the present exemplary embodiment, "first side in the axial direction" is defined as the right side in FIGS. 2 and 3. The term "second side in the axial direction" refers to the opposite side of the first side in the axial direction. Additionally, the term "circumferential direction" refers to a circumferential direction of an imaginary circle about the rotational axis O. The term "radial direction" refers to a radial direction of the imaginary circle about the rotational axis O.

As shown in FIGS. 1 to 4, a clutch device 100 is configured to allow or block transmission of power from an engine to a transmission. The clutch device 100 includes a clutch housing 2, a clutch center 3, a pressure plate 4, a clutch part 5 and a plurality of cam mechanisms 6. Additionally, the clutch device 100 further includes a release member 7 and a plurality of urging members 8.

As shown in FIG. 2, the clutch housing 2 includes a disc part 21 and a tubular part 22, and is coupled to an input gear 10 (an exemplary input-side member). The input gear 10 is an approximately annular member to which power generated by the engine (not shown in the drawings) is inputted. The input gear 10 is meshed with a drive gear (not shown in the drawings) fixed to an engine-side crankshaft.

The disc part 21 includes a plurality of protrusions 21a protruding to the first side in the axial direction. The protrusions 21a are aligned at predetermined intervals in the circumferential direction. The input gear 10 is coupled to the disc part 21 through a plurality of coil springs 11. The plural protrusions 21a of the disc part 21 and the plural coil springs 11 are inserted into a hole 10a included in the input gear 10. Additionally, the clutch housing 2 and the input gear 10 are coupled through a plate 12 and rivets 13. The coil springs 11 are provided for absorbing vibration from the engine.

The tubular part 22 is provided to extend from the outer peripheral edge of the disc part 21 to the first side in the axial direction. The tubular part 22 includes a plurality of cutouts 22a extending in the axial direction. The plural cutouts 22a are aligned at predetermined intervals in the circumferential direction.

The clutch center 3 is disposed on the first side of the clutch housing 2 in the axial direction. Additionally, the clutch center 3 is disposed radially inside the tubular part 22 of the clutch housing 2. The clutch center 3 includes a pressure receiving part 31.

The clutch center 3 has an approximately disc shape and includes a boss part 32 in the middle part thereof. The boss part 32 extends to protrude to the second side in the axial direction. The boss 32 includes an axially extending spline hole 32a in the middle part thereof. An input shaft of the transmission (not shown in the drawings) is engaged with the spline hole 32a. A thrust plate 14 is provided between the boss part 32 and the middle part of the input gear 10. The clutch center 3 is not moved in the axial direction.

The clutch center 3 includes a plurality of first recesses 33. The first recesses 33 are recessed to the second side in the axial direction. The respective first recesses 33 are aligned at intervals in the circumferential direction. It should be noted that the respective first recesses 33 are disposed in opposition to second recesses 72 included in the release member 7. Each first recess 33 accommodates one of the ends of each urging member 8.

The pressure receiving part 31 is included in the outer peripheral part of the clutch center 3. The pressure receiving part 31 has an annular shape. The pressure receiving part 31 faces the second side in the axial direction. The pressure receiving part 31 is opposed to the clutch part 5.

The pressure plate 4 includes a pressure applying part 41. The pressure plate 4 has an annular shape, and the outer peripheral part thereof corresponds to the pressure applying part 41. The pressure applying part 41 has an annular shape. The pressure applying part 41 faces the first side in the axial direction. Additionally, the pressure applying part 41 is disposed at an interval from the pressure receiving part 31 in the axial direction. The clutch part 5 is disposed between the pressure applying part 41 and the pressure receiving part 31. In other words, the pressure applying part 41, the clutch part 5 and the pressure receiving part 31 are sequentially aligned in this order from the second side to the first side in the axial direction. When the clutch part 5 is removed, the pressure applying part 41 and the pressure receiving part 31 are disposed in opposition to each other. The pressure applying part 41 presses the clutch part 5 to the first side in the axial direction. The pressure applying part 41 is capable of being engaged by friction with a friction facing on the endmost one of first and second clutch plates on the second side in the axial direction. A clutch-on state (a power transmission allowed state) is made when the clutch part 5 is pressed by the pressure applying part 41 and the pressure receiving part 31 while being interposed therebetween.

The pressure plate 4 is attached to the boss part 32 of the clutch center 3. It should be noted that the pressure plate 4 is movable in the axial direction. In other words, the pressure plate 4 slides on the boss part 32 of the clutch center 3.

The pressure plate 4 includes a plurality of protrusions 42. The respective protrusions 42 extend to the first side in the axial direction. The respective protrusions 42 are disposed at equal intervals in the circumferential direction. Each protrusion 42 includes a screw hole 42*a* axially extending in the center part thereof. The respective protrusions 42 extend to the first side of the clutch center 3 in the axial direction through a plurality of through holes 34 included in the clutch center 3.

The clutch part 5 includes at least one first clutch plate 51 and at least one second clutch plate 52. The first and second clutch plates 51 and 52 are disposed between the pressure receiving part 31 and the pressure applying part 41. Transmission of power is allowed or blocked between the clutch housing 2 and the clutch center 3 through the first and second clutch plates 51 and 52. Both types of clutch plates 51 and 52 have annular shapes and are alternately disposed in the axial direction.

The at least one first clutch plate 51 is axially movable with respect to the clutch housing 2, while being non-rotatable relatively thereto. In other words, the at least one first clutch plate 51 is unitarily rotated with the clutch housing 2. When described in detail, each of the at least one first clutch plate 51 includes a plurality of engaging protrusions that protrude radially outside from the outer peripheral part thereof. The engaging protrusions are meshed with the cutouts 22*a* included in the tubular part 22 of the clutch housing 2. Friction members are attached to both surfaces of each of the at least one first clutch plate 51. One of the friction members attached to the endmost one of the at least one first clutch plate 51 on the first side in the axial direction is capable of being engaged by friction with the pressure receiving part 31 of the clutch center 3.

Each of the at least one second clutch plate 52 includes a plurality of engaging protrusions that protrude radially inside from the inner peripheral end thereof. The engaging protrusions are meshed with engaging grooves 43 included in the pressure plate 4. Therefore, the at least one second clutch plate 52 is axially movable with respect to the pressure plate 4, while being non-rotatable relatively thereto. In other words, the at least one second clutch plate 52 is unitarily rotated with the pressure plate 4.

As shown in FIG. 3, the respective cam mechanisms 6 are disposed on the first side of the clutch center 3 and the pressure plate 4 in the axial direction. Specifically, the respective cam mechanisms 6 are disposed between the clutch center 3 and the release member 7. In other words, the pressure plate 4, the clutch center 3, the cam mechanisms 6 and the release member 7 are sequentially disposed in this order from the second side to the first side in the axial direction.

Figure 5:
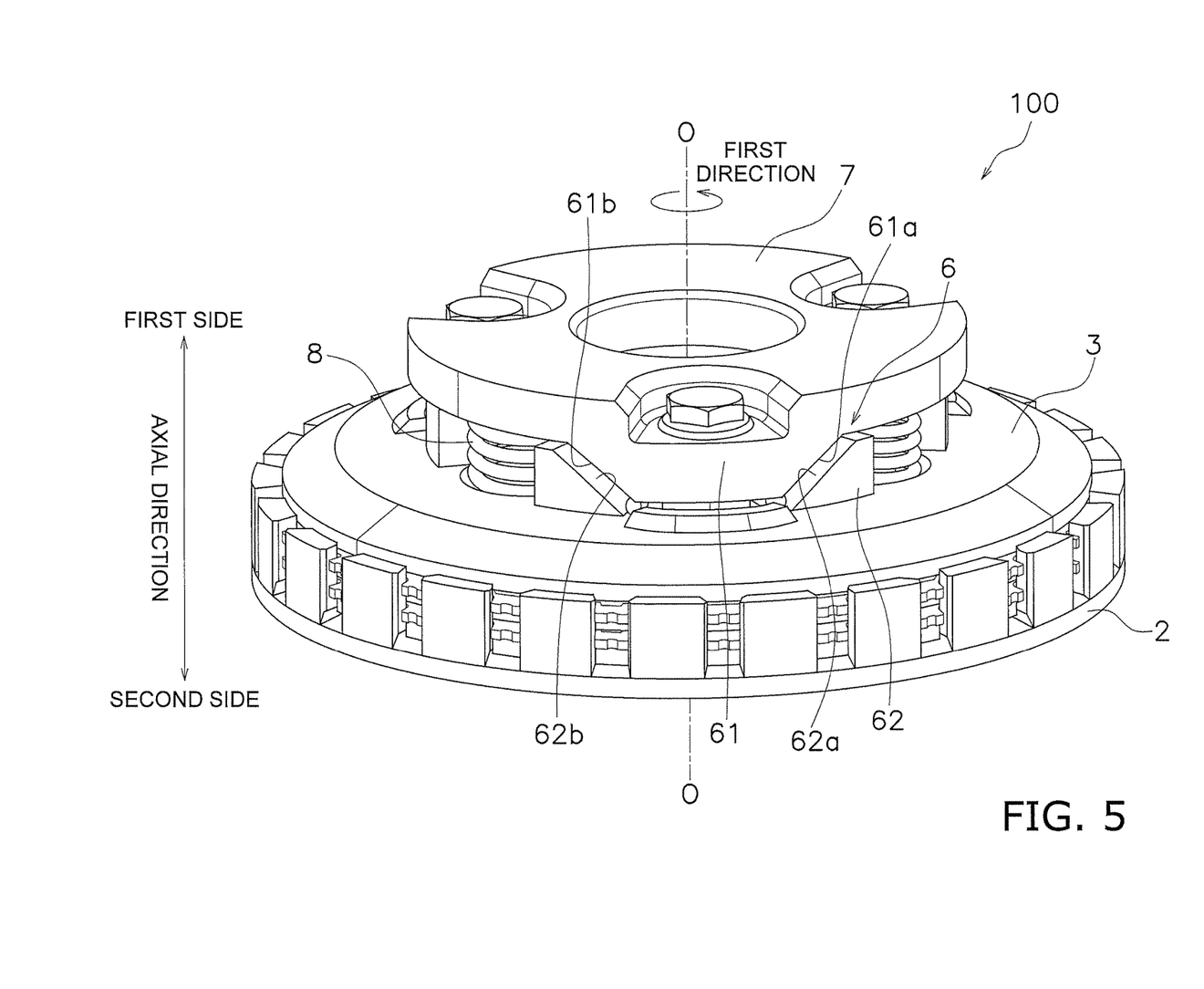
FIG. 5 is a perspective view of the clutch device.

As shown in FIG. 5, each cam mechanism 6 includes a first cam part 61 and a second cam part 62. The first cam part 61 is fixed to the release member 7, whereas the second cam part 62 is fixed to the clutch center 3. Detailedly, the first cam part 61 is integrated with the release member 7. On the other hand, the second cam part 62 is integrated with the clutch center 3. The second cam part 62 is divided into two halves disposed such that the first cam part 61 is interposed therebetween in the circumferential direction. It should be noted that the respective cam mechanisms 6 are disposed at intervals in the circumferential direction.

Each first cam part 61 includes a first slope 61*a* and a third slope 61*b*. Each second cam part 62 includes a second slope 62*a* and a fourth slope 62*b*. The first slope 61*a* and the second slope 62*a* are opposed to each other. The first slope 61*a* and the second slope 62*a* are disposed at an interval. It should be noted that the first slope 61*a* and the second slope 62*a* may be contacted to each other.

The first slope 61*a* and the second slope 62*a* tilt along the same direction with respect to the circumferential direction. Detailedly, the first slope 61*a* tilts to face the second side in the axial direction and face a first direction making up the circumferential direction. On the other hand, the second slope 62*a* tilts to face the first side in the axial direction and face a second direction making up the circumferential direction. It should be noted that in the present exemplary embodiment, the first direction making up the circumferential direction means the counterclockwise direction in FIG. 5. On the other hand, the second direction making up the circumferential direction is an opposite direction to the first direction. In other words, in the present exemplary embodiment, the second direction making up the circumferential direction means the clockwise direction in FIG. 5. In the present exemplary embodiment, the rotational direction of the clutch device 100 is the same as the first direction making up the circumferential direction.

The third slope 61*b* and the fourth slope 62*b* are opposed to each other. The third slope 61*b* and the fourth slope 62*b* are disposed at an interval. It should be noted that the third slope 61*b* and the fourth slope 62*b* may be contacted to each other.

The third slope 61*b* and the fourth slope 62*b* tilt along the same direction with respect to the circumferential direction. Detailedly, the third slope 61*b* tilts to face the second side in the axial direction and face the second direction making up the circumferential direction. On the other hand, the fourth slope 62*b* tilts to face the first side in the axial direction and face the first direction making up the circumferential direction. In other words, the third slope 61*b* and the fourth slope 62*b* tilt in a different direction from the first slope 61*a* and the second slope 62*a*.

Figure 6:
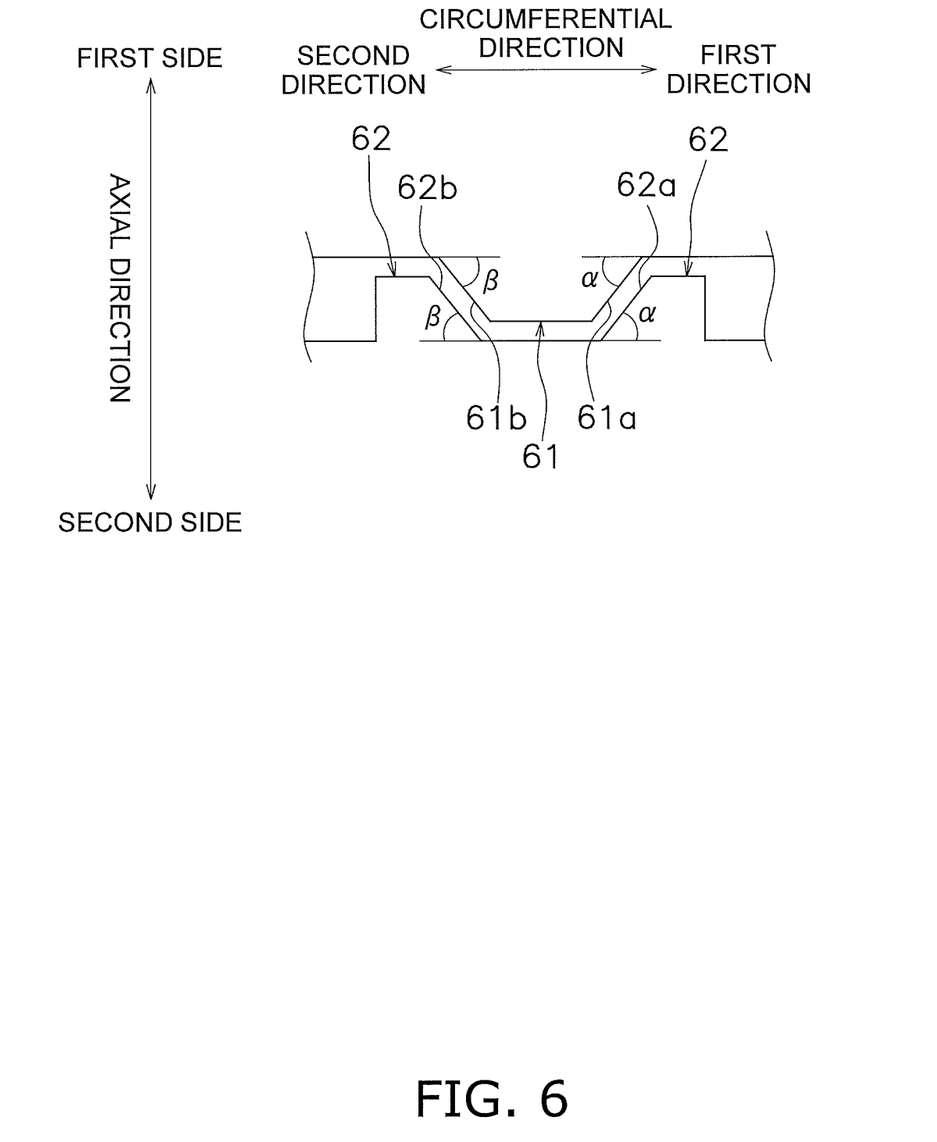
FIG. 6 is a schematic diagram of a cam mechanism.

As shown in FIG. 6, a tilt angle α of each of the first and second slopes 61*a* and 62*a* relative to a plane perpendicular to the axial direction can be set to fall in a range of approximately 20 to 70 degrees. Likewise, a tilt angle β of each of the third and fourth slopes 61*b* and 62*b* relative to the plane perpendicular to the axial direction can be set to fall in a range of approximately 20 to 70 degrees. The tilt angle α of each of the first and second slopes 61*a* and 62*a* is the same as the tilt angle β of each of the third and fourth slopes 61*b* and 62*b*. It should be noted that the tilt angle α of each of the first and second slopes 61*a* and 62*a* may be different from the tilt angle β of each of the third and fourth slopes 61*b* and 62*b*. For example, the tilt angle β of each of the third and fourth slopes 61*b* and 62*b* can be set to be greater than the tilt angle α of each of the first and second slopes 61*a* and 62*a*. With this setting, when the clutch device 100 is rotated in the first direction, for instance, a smaller clutch engaging force can be produced when a torque is inputted into the clutch device 100 from the clutch center 3 than when a torque is inputted into the clutch device 100 from the input gear 10.

As shown in FIG. 2, the release member 7 is disposed on the first side of the clutch center 3 in the axial direction. The cam mechanisms 6 are disposed between the release member 7 and the clutch center 3. The release member 7 is coupled to the pressure plate 4. The release member 7 has an approximately disc shape and includes an opening 71 in the middle part thereof. A release mechanism (not shown in the drawings) is coupled to the opening 71.

The release member 7 includes the plurality of second recesses 72. The respective second recesses 72 are shaped to be recessed to the first side in the axial direction. Additionally, the respective second recesses 72 are aligned at intervals in the circumferential direction. The respective second recesses 72 are disposed in opposition to the first recesses 33 included in the clutch center 3. Each second recess 72 accommodates the other of the ends of each urging member 8. In other words, each urging member 8 is disposed between each first recess 33 and each second recess 72.

The release member 7 includes a plurality of through holes 73. The respective through holes 73 are disposed at intervals in the circumferential direction. It should be noted that one of the through holes 73 is disposed between circumferentially adjacent two of the second recesses 72. In other words, the second recesses 72 and the through holes 73 are alternately provided in the circumferential direction. Moreover, bolts 15 are screwed into the screw holes 42a of the protrusions 42 of the pressure plate 4 through the through holes 73, respectively. With this configuration, the release member 7 is fixed to the pressure plate 4.

The urging members 8 are disposed between the release member 7 and the clutch center 3. The release member 7 and the clutch center 3 are urged oppositely by the urging members 8. For example, the urging members 8 are coil springs.

Next, the action of the clutch device 100 will be explained. It should be noted that the clutch device 100 is assumed to be rotated in the counterclockwise direction in FIG. 5. When a release operation is not being performed in the clutch device 100, the release member 7 and the clutch center 3 are urged oppositely by the urging members 8. The clutch center 3 is not moved in the axial direction. Hence, the release member 7 is moved to the first side in the axial direction. The release member 7 is coupled to the pressure plate 4. Hence, the pressure plate 4 is also moved to the first side in the axial direction. As a result, the clutch part 5 is turned into the transmission allowed state.

In this state, a torque from the engine is inputted into the input gear 10 and the clutch housing 2, and is then transmitted to the clutch center 3 and the pressure plate 4 through the clutch part 5. Additionally, the torque transmitted to the pressure plate 4 is transmitted to the cam mechanisms 6 through the release member 7, and the pressure plate 4 presses the clutch part 5 with a greater force whereby the clutch engaging force is increased.

Detailedly, the first cam parts 61 are rotated relatively to the second cam parts 62 in the first direction making up the circumferential direction by the torque from the pressure plate 4. With this relative rotation, the first slopes 61a and the second slopes 62a are pressed against each other in the axial direction. As a result, the first cam parts 61 are moved relatively to the second cam parts 62 so as to separate from the second cam parts 62 in the axial direction. Specifically, the clutch center 3 to which the second cam parts 62 are fixed is not moved in the axial direction. Hence, the first cam parts 61 are moved to the first side in the axial direction. In conjunction with the first cam parts 61 moved relatively to the second cam parts 62 so as to separate from the second cam parts 62, the pressure applying part 41 of the pressure plate 4 is moved to the first side in the axial direction. In other words, the pressure applying part 41 of the pressure plate 4 is moved toward the pressure receiving part 31 of the clutch center 3. As a result, the clutch engaging force is increased.

On the other hand, when a rider returns a throttle grip to reduce acceleration, the first cam parts 61 are rotated relatively to the second cam parts 62 in the second direction by the torque from the clutch center 3. With this relative rotation, the third slopes 61b and the fourth slopes 62b are pressed against each other in the axial direction. As a result, the first cam parts 61 are moved relatively to the second cam parts 62 so as to separate from the second cam parts 62 in the axial direction. Specifically, the clutch center 3 to which the second cam parts 62 are fixed is not moved in the axial direction. Hence, the first cam parts 61 are moved to the first side in the axial direction. In conjunction with the first cam parts 61 moved relatively to the second cam parts 62 so as to separate from the second cam parts 62, the pressure applying part 41 of the pressure plate 4 is moved to the first side in the axial direction. In other words, the pressure applying part 41 of the pressure plate 4 is moved toward the pressure receiving part 31 of the clutch center 3. As a result, the clutch engaging force is increased.

Next, when the rider squeezes a clutch lever, the operating force is transmitted to the release mechanism through a clutch wire and so forth. The release member 7 is moved to the second side in the axial direction by the release mechanism against the urging force of the urging members 8. When the release member 7 is moved to the second side in the axial direction, the pressure plate 4 coupled to the release member 7 is also moved to the second side in the axial direction. Accordingly, pressure of the pressure plate 4 onto the clutch part 5 is released, and the clutch part 5 is turned into an off state. In this clutch-off state, rotation from the clutch housing 2 is not transmitted to the clutch center 3.

MODIFICATIONS

One exemplary embodiment of the present disclosure has been described above. However, the present disclosure is not limited to the aforementioned exemplary embodiment, and a variety of changes can be made without departing from the scope of the present disclosure.

Modification 1

The aforementioned exemplary embodiment has explained the configuration that the clutch device 100 is rotated in the counterclockwise direction in FIG. 5. However, the clutch device 100 may be rotated in the clockwise direction. In this case, when the rider returns the throttle grip to reduce acceleration, for instance, a torque is inputted from the clutch center 3, whereby the first cam parts 61 are rotated relatively to the second cam parts 62 in the first direction. Similarly in this case, the first direction making up the circumferential direction means the counterclockwise direction in FIG. 5. In other words, the rotational direction of the clutch device 100 and the first direction are opposite to each other.

When the first cam parts 61 are rotated relatively to the second cam parts 62 in the first direction, similarly to the aforementioned exemplary embodiment, the first cam parts 61 are moved to the first side in the axial direction, and the pressure applying part 41 of the pressure plate 4 is moved toward the pressure receiving part 31 of the clutch center 3. As a result, the clutch engaging force is increased.

Modification 2

In the aforementioned exemplary embodiment, the clutch-on state is made when the pressure plate 4 is moved to the first side in the axial direction, whereas the clutch-off state is made when the pressure plate 4 is moved to the second side in the axial direction. However, the configuration to make the clutch-on state and the clutch-off state is not particularly limited to this.

Figure 7:
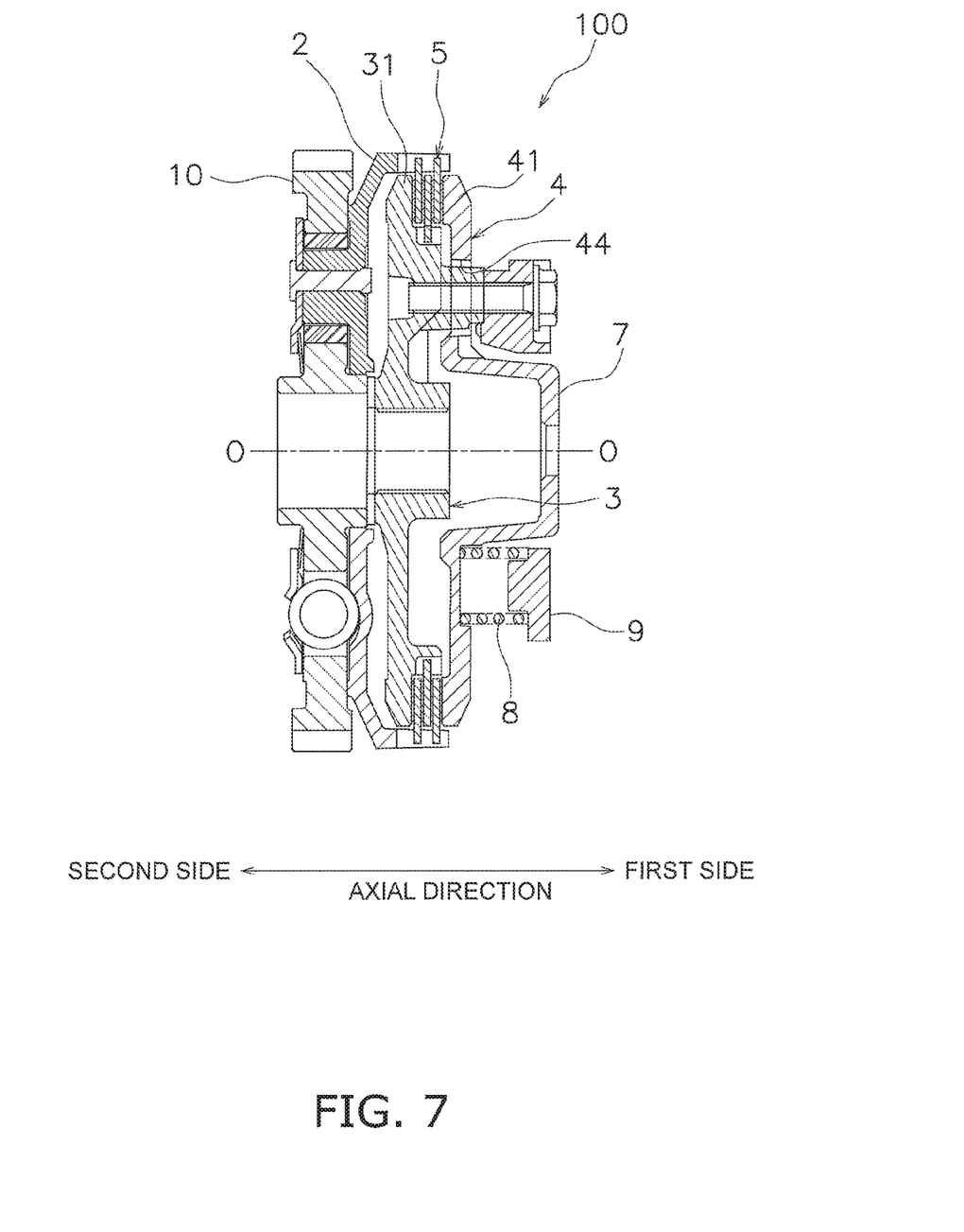
FIG. 7 is a cross-sectional view of a clutch device according to a modification.
Figure 8:
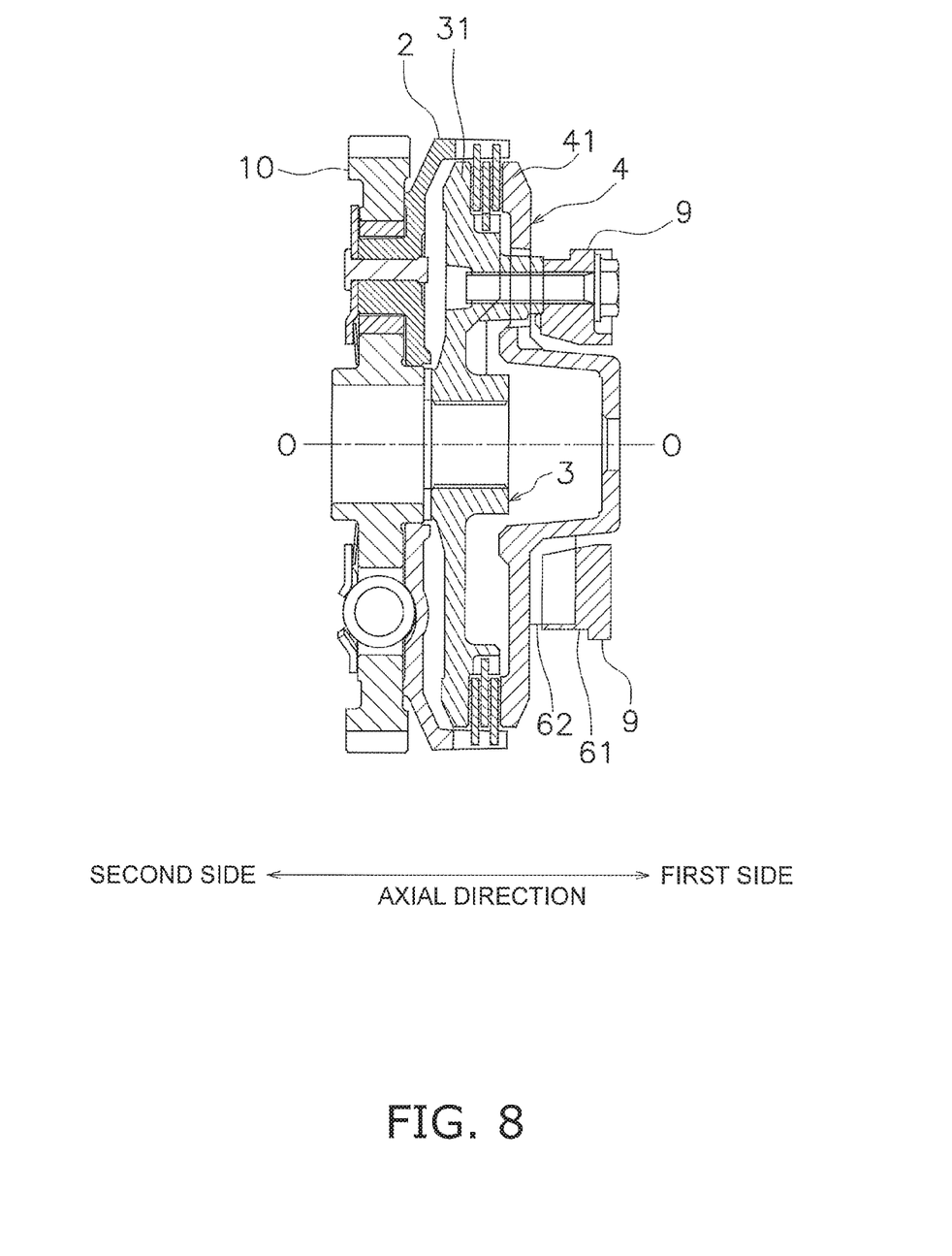
FIG. 8 is a cross-sectional view of the clutch device according to the modification.

For example, as shown in FIGS. 7 and 8, the pressure plate 4 is disposed on the first side of the clutch center 3 in the axial direction. The pressure applying part 41 of the pressure plate 4 faces the second side in the axial direction, whereas the pressure receiving part 31 of the clutch center 3 faces the first side in the axial direction. Additionally, the clutch device 100 further includes a support member 9. The support member 9 is disposed on the first side of the pressure plate 4 in the axial direction. The support member 9 is coupled to the clutch center 3. Detailedly, the clutch center 3 and the support member 9 are coupled through a plurality of through holes 44 included in the pressure plate 4. The support member 9 preferably has an annular shape.

The urging members 8 are disposed between the support member 9 and the pressure plate 4. The support member 9 is coupled to the clutch center 3, and hence is not moved in the axial direction. Therefore, the pressure plate 4 is urged to the second side in the axial direction by the urging members 8.

The first cam parts 61 are fixed to the support member 9, whereas the second cam parts 62 are fixed to the pressure plate 4. It should be noted that the first cam parts 61 are integrated with the support member 9, whereas the second cam parts 62 are integrated with the pressure plate 4.

Figure 9:
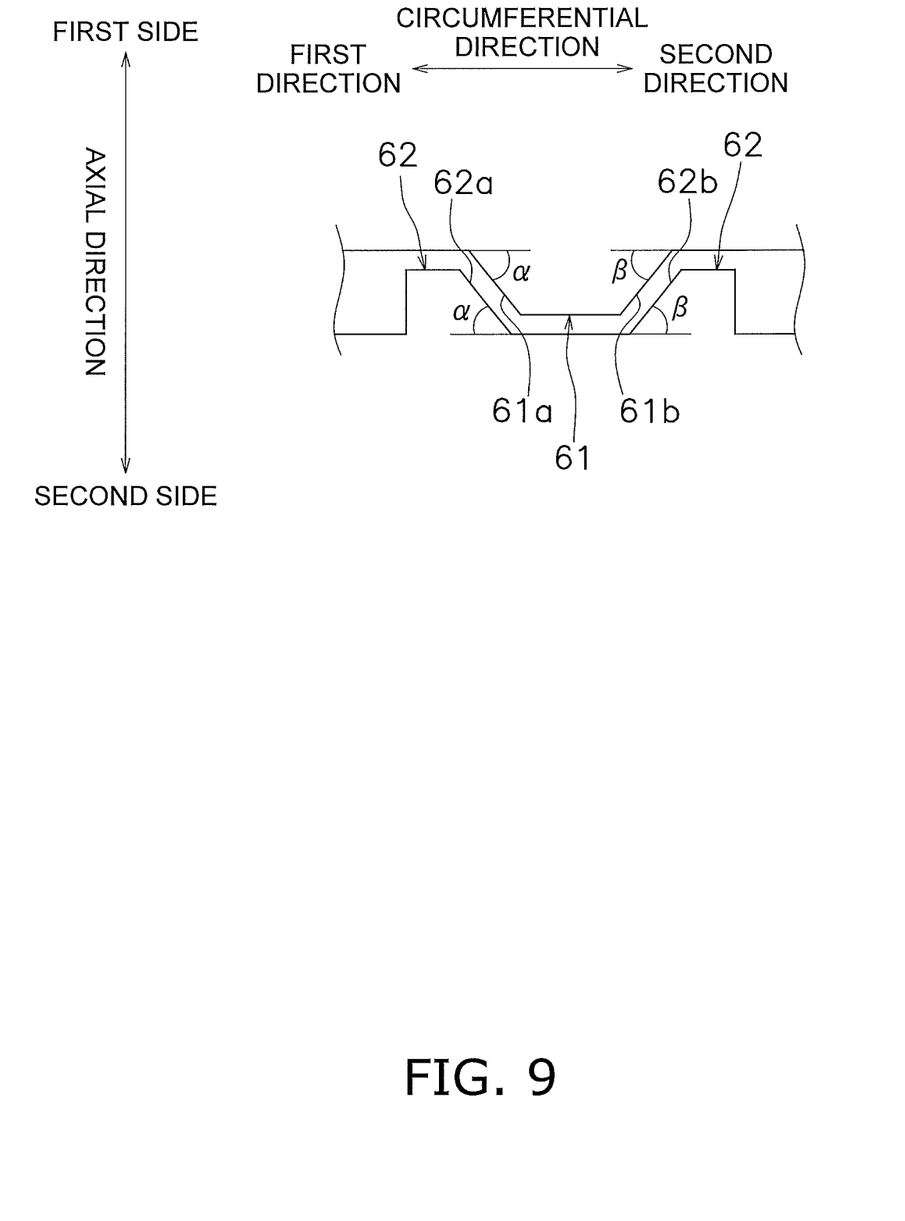
FIG. 9 is a schematic diagram of a cam mechanism according to the modification.

The action of the clutch device 100 according to the modification 2 will be explained. As shown in FIG. 9, the first cam parts 61 are rotated relatively to the second cam parts 62 in the first direction making up the circumferential direction by the torque from the pressure plate 4. It should be noted that the first direction in the modification 2 is opposite to that in the aforementioned preferred embodiment. With this relative rotation, the first slopes 61a and the second slopes 62a are pressed against each other in the axial direction. As a result, the first cam parts 61 are moved relatively to the second cam parts 62 so as to separate from the second cam parts 62. Specifically, the support member 9 to which the first cam parts 61 are fixed is not moved in the axial direction. Hence, the second cam parts 62 are moved to the second side in the axial direction. In conjunction with separation between the first cam parts 61 and the second cam parts 62, the pressure applying part 41 of the pressure plate 4 is moved to the second side in the axial direction. In other words, the pressure applying part 41 of the pressure plate 4 is moved toward the pressure receiving part 31 of the clutch center 3. As a result, the clutch engaging force is increased.

On the other hand, when the rider returns the throttle grip to reduce acceleration, the first cam parts 61 are rotated relatively to the second cam parts 62 in the second direction by the torque from the clutch center 3. With this relative rotation, the third slopes 61b and the fourth slopes 62b are pressed against each other in the axial direction. As a result, the first cam parts 61 are moved relatively to the second cam parts 62 so as to separate from the second cam parts 62. Specifically, the support member 9 to which the first cam parts 61 are fixed is not moved in the axial direction. Hence, the second cam parts 62 are moved to the second side in the axial direction. In conjunction with separation between the first cam parts 61 and the second cam parts 62, the pressure applying part 41 of the pressure plate 4 is moved to the second side in the axial direction. In other words, the pressure applying part 41 of the pressure plate 4 is moved toward the pressure receiving part 31 of the clutch center 3. As a result, the clutch engaging force is increased.

Modification 3

In the aforementioned preferred embodiment, the coil springs are exemplified as the urging members 8. However, disc springs or so forth may be used instead of the coil springs.

REFERENCE SIGNS LIST

2 Clutch housing
3 Clutch center
31 Pressure receiving part
4 Pressure plate
41 Pressure applying part
5 Clutch part
6 Cam mechanism
61 First cam part
62 Second cam part
7 Release member
8 Urging member
9 Support member

The invention claimed is:
1. A clutch device comprising:
a clutch housing;
a clutch center including a pressure receiving part, the clutch center disposed on a first side of the clutch housing in an axial direction;
a pressure plate including a pressure applying part, the pressure applying part disposed at an interval from the pressure receiving part in the axial direction;
a clutch part disposed between the pressure receiving part and the pressure applying part, the clutch part for allowing and blocking transmission of a power between the clutch housing and the pressure plate; and
a cam mechanism including a first cam part and a second cam part, the first and second cam parts disposed on the first side of the clutch center and the pressure plate in the axial direction, wherein
the first cam part includes a first slope,
the second cam part includes a second slope, the second slope opposed to the first slope,
when the first cam part is rotated relatively to the second cam part in a first direction making up a circumferential direction, the first slope and the second slope are pressed against each other in the axial direction whereby the first cam part is moved relatively to the second cam part so as to separate from the second cam part in the axial direction, and the pressure applying part is moved toward the pressure receiving part as the first cam part is moved relatively to the second cam part so as to separate from the second cam part.
2. The clutch device according to claim 1, wherein
the first cam part includes a third slope,
the second cam part includes a fourth slope, the fourth slope opposed to the third slope, and
when the first cam part is rotated relatively to the second cam part in a second direction, the third slope and the fourth slope are pressed against each other in the axial direction whereby the first cam part is moved relatively to the second cam part so as to separate from the second cam part in the axial direction.
3. The clutch device according to claim 1, further comprising:

a release member disposed on the first side of the clutch center in the axial direction, the release member coupled to the pressure plate; and an urging member disposed between the release member and the clutch center, wherein the pressure applying part faces the first side in the axial direction, the pressure receiving part faces a second side in the axial direction, the first cam part is fixed to the release member, and the second cam part is fixed to the clutch center.

4. The clutch device according to claim 1, further comprising:

a support member coupled to the clutch center, the support member disposed on the first side of the pressure plate in the axial direction; and an urging member disposed between the support member and the pressure plate, wherein the pressure applying part faces a second side in the axial direction, the pressure receiving part faces the first side in the axial direction, the first cam part is fixed to the support member, and the second cam part is fixed to the pressure plate.

5. The clutch device according to claim 2, wherein the fourth slope faces the first side in the axial direction and faces a first circumferential direction, and the third slope faces a second side in the axial direction and a second circumferential direction.

6. The clutch device according to claim 1, wherein the first slope faces a second side in the axial direction and a first circumferential direction, and the second slope faces the first side in the axial direction and a second circumferential direction.

7. The clutch device according to claim 2, wherein, when the clutch device is rotated in the first direction making up the circumferential direction, the third slope slants at a greater angle than the first slope.

* * * * *